(12) United States Patent
Mohr et al.

(10) Patent No.: US 8,965,698 B2
(45) Date of Patent: Feb. 24, 2015

(54) REAL TIME THERMAL LINE RATINGS FOR OVERHEAD TRANSMISSION LINE

(75) Inventors: Robert Mohr, Tigard, OR (US); Sarantos K. Aivaliotis, Ridgefield, CT (US); Zenon Stelmak, Monroe, CT (US)

(73) Assignee: Nexans, Paris (FR)

( * ) Notice: Subject to any disclaimer, the term of this patent is extended or adjusted under 35 U.S.C. 154(b) by 71 days.

(21) Appl. No.: 12/980,922

(22) Filed: Dec. 29, 2010

(65) Prior Publication Data

US 2012/0173146 A1    Jul. 5, 2012

(51) Int. Cl.
*G01W 1/00*    (2006.01)

(52) U.S. Cl.
CPC .................... *G01W 1/00* (2013.01)
USPC ................................ 702/3; 702/60

(58) Field of Classification Search
USPC .............. 702/57, 3, 130, 132, 59, 60, 61, 62; 324/105, 142, 106
See application file for complete search history.

(56) References Cited

U.S. PATENT DOCUMENTS

| | | | |
|---|---|---|---|
| 5,341,088 A * | 8/1994 | Davis | 324/106 |
| 5,517,864 A | 5/1996 | Seppa | |
| 2008/0077336 A1* | 3/2008 | Fernandes | 702/57 |

* cited by examiner

*Primary Examiner* — Michael Nghiem
*Assistant Examiner* — Eman Alkafawi
(74) *Attorney, Agent, or Firm* — Sofer & Haroun, LLP (57) ABSTRACT

A system for generating line ratings includes a module for receiving data concerning a power line, a module for stores the data concerning said power line, and a module receives weather data associated with each of the geographic locations along the length of the power line. A processor is configured to select between generating a line rating based on the at least one tension/sag measurement and the weather data associated with each of said geographic locations along the length of said power line, where if the power line has a load exceeding a predetermined threshold, then the processor generates a line rating based on the at least one tension/sag measurement, and where if the power line has a load below the predetermined threshold, then the processor generates a line rating based on the weather data associated with each of the geographic locations along the length of the power line.

16 Claims, 11 Drawing Sheets

REAL TIME THERMAL LINE RATINGS FOR OVERHEAD TRANSMISSION LINE

BACKGROUND

1. Field of the Invention

This application relates to power line management. More particularly, the present arrangement relates to thermal line ratings.

2. Description of Related Art

The thermal rating of an overhead power line is the maximum current that the line can transfer without overheating. The line rating is a function of, among other things, the weather conditions seen along the line, including wind speed, wind direction, air temperature, and solar heating.

The thermal rating of transmission lines is based on the conductor sag. As electrical current increases through an overhead conductor, the conductor temperature increases and therefore the conductor expands and sags. Each line has a minimum clearance to ground, which should never be violated for safety reasons. The thermal rating represents the maximum current that may pass through the line so that the conductor will not sag below the minimum clearance. Any additional current would result in a safety violation because of excessive sag.

In general, an equation to calculate conductor rating is developed by first recognizing that the total input heat (per unit length) to a conductor must equal the total output heat in the steady state. The conductor is heated by ohmic losses ($I^2R$) and solar input, and it is cooled by convection (wind) and radiation.

In simplified form—

$$I_{rating} = \sqrt{((Q_{convection} + Q_{radiation} - Q_{solar})/R)}$$

$Q_{convection}$=heat output from air temp, wind speed, etc. . . .
$Q_{radiation}$=heat output from radiation to atmosphere
$Q_{solar}$=heat input from solar radiation
R=Resistance to electricity flowing through the line In the United States, the standard method for calculation of transmission line ampacity [rating] in steady and transient states is the IEEE Standard 738 (2006). Elsewhere in the world, the most commonly used standard is that established by Cigré (1992, 1997, 1999). The present arrangement describes a system using IEEE 738 for its rating method, however any rating method could be substituted as needed.

Most utilities have adopted a static (fixed) rating for each line based on a semi-worst-case weather approach. The most common weather assumptions made under that approach are 40° C. (104° F.) air temperature, full solar radiation (no clouds), and 0.6 m/s (2 ft/s) wind speed perpendicular to the conductor. At any given time, the actual line rating normally exceeds the static rating due to weather conditions being more favorable than assumed. A small percentage of the time, typically about 2%, the actual weather conditions are worse than those assumed resulting in an actual rating below the static rating. Therefore, using a static rating approach can result in either underutilizing much of the line's transfer capacity most of the time, or in violating the maximum permitted sag some of the time.

Currently, there are several methods for generating a dynamic (real-time) line rating for any given power transmission line. One such method is to use direct meteorological data obtained from weather stations installed along the power transmission lines. This allows for the use of actual weather data instead of assumed weather data. However, there is a high cost associated with placing the necessarily numerous weather stations required to collect an adequate amount of data to capture the spatial variability of wind along the transmission line, as noted for example in Cigré Technical Brochure 299 "Guide for selection of weather parameters for bare overhead conductor ratings." In addition, weather station only based monitoring systems provide no direct feedback from the transmission line to verify that clearances are being maintained.

Another method for generating line ratings is to directly measure tension and/or sag using instruments placed periodically along the transmission line. This obviously produces direct feedback about the line conditions and thus is more accurate and reliable than the use of weather stations alone.

This direct tension/sag measurement method also requires an initial capital input, albeit less than that required for weather stations, to place the monitors. Also, these monitors work best when conductor temperatures are elevated and line sag is greater (caused by moderate to high line current and/or low wind speed conditions), which means they are good at detecting and mitigating safety concerns. When conditions are such that the line current is low or the wind speeds are very high, the lines do not heat up and sag as much, and the monitors become less effective at calculating line ratings. Under such conditions prior art systems using tension/sag monitors must default to alternate rating methods in order to generate a rating. These alternate methods again employ fixed assumptions for wind speed input, while using measured temperature values to determine the ambient and solar heat inputs. While operationally safe, these methods, as with the other prior art methods, understate the actual rating in most cases, and generate large step discontinuities in rating output when switching between the default method and the primary tension/sag based calculation.

OBJECTS AND SUMMARY

The present arrangement provides a real-time thermal rating system for use with power transmission/overhead electric transmission lines.

To achieve this, improved high resolution weather monitoring and modeling is utilized to generate the dynamic line ratings of overhead power lines. Among other features, this allows the dynamic line rating to be adjusted to account for micro level weather variations on a real time basis so that the full capacity of the power line/grid may be utilized while also improving the safety of such lines.

To this end, the present arrangement provides a system for generating line ratings and includes a module for receiving data concerning a power line. The data has location data including geographic locations along the length of the said power line, at least one tension/sag measurement, and at least one physical fact concerning the power line. A module for storing the data concerning said power line and a module for receiving weather data is associated with each of the geographic locations along the length of the power line. A processor is configured to select between generating a line rating based on the at least one tension/sag measurement and the weather data associated with each of said geographic locations along the length of said power line, where if the power line has a load exceeding a predetermined threshold, then the processor generates a line rating based on the at least one tension/sag measurement, and where if the power line has a load below the predetermined threshold, then the processor generates a line rating based on the weather data associated with each of the geographic locations along the length of the power line.

DETAILED DESCRIPTION

The present arrangement provides a real time DLR (Dynamic Line Rating) system for overhead lines based on modeled weather data that, among other features, takes into account real-time wind speed variations over small geographic distances.

As a general overview, configuration of the present system begins by preparing GPS/location data for a particular power line to be rated. Locations are selected by examining critical physical parameters of the line such as elevation, direction/angle changes, surrounding vegetation or structures, and surrounding terrain. Locations are selected at a density appropriate to cover the expected variability in wind speeds along the transmission line corridor. Next a database of line parameters is assembled which identifies, among other details, the conductor type in use, the number of sub-conductors per bundle, the maximum operating temperature for the line, etc. In operation, the system receives very accurate modeled weather data for each of these line locations. Details of this process are outlined below.

High resolution weather modeling and prediction services are used that can provide localized weather (down to a scale of 1 km×1 km or less) that would otherwise require an impractical number of discreet weather monitoring instruments. The weather models employed are able to achieve this degree of accuracy by starting with global scale weather data and then processing those measurements via advanced weather prediction models deployed across super computer calculation farms to generate fine scale predictions at multiple locations. In particular this detailed weather model data better takes into account the spatial variability of wind without the need for investment in weather stations at each location of interest. This modeled data may be provided at very frequent intervals, such as every 10 minutes, for use in updating the present system. The details of the weather data are set forth below.

Once weather data is received, a line rating is generated for each section of the line, with the lowest of the individual section ratings being applied to the entire line as the limiting case. This ensures that no section of the line is sagged beyond clearance limits.

Figure 1:
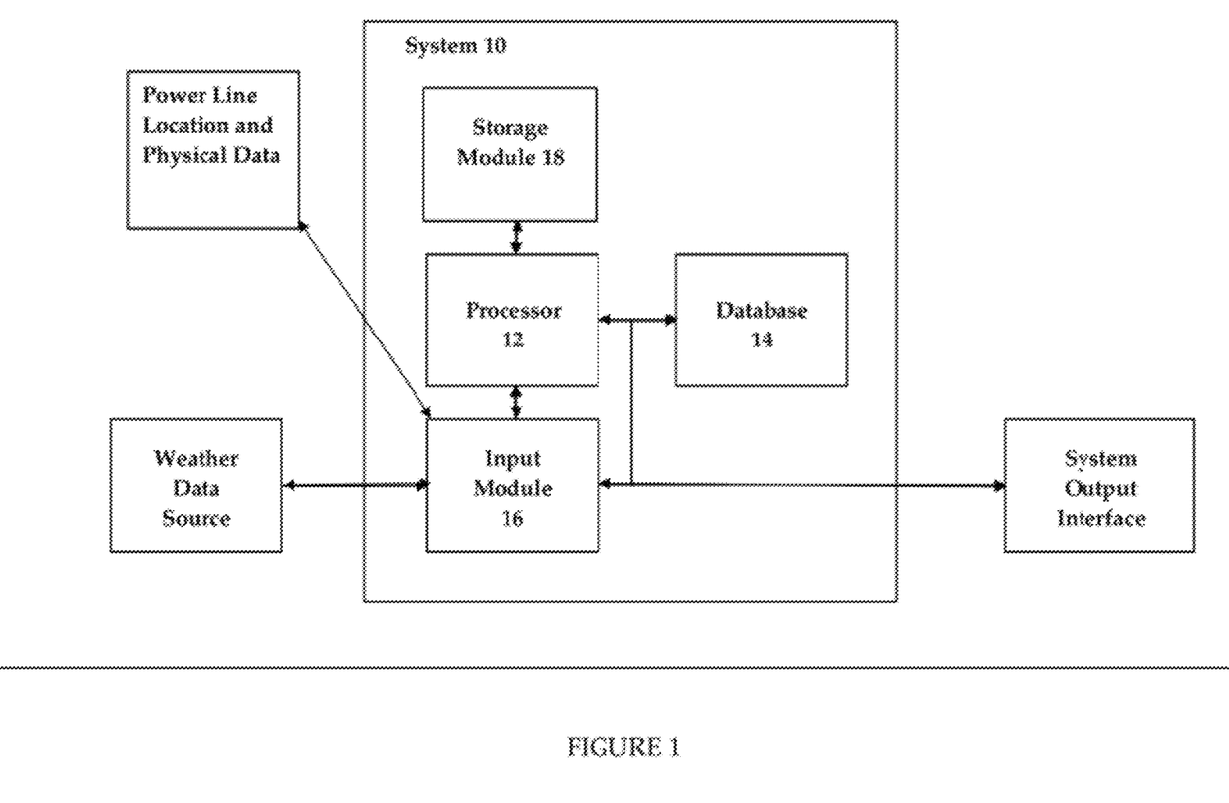
FIG. 1 shows a dynamic power line rating system in accordance with one embodiment.

Turning to the details of one embodiment of the system, as shown for example in FIG. 1, an exemplary line rating system 10 is shown. It is understood that the components shown in system 10 are exemplary. The functions of certain components may be combined or separated and additional components and functions may be added without adversely affecting the produced ratings from the system.

System 10 includes a processor 12 for generating a power line rating for one or more power lines as explained in detail below. A storage module 18 is used to maintain configuration information which describes the geographical layout of the line to be monitored, the characteristics of that line (i.e. conductor type, properties, operating parameters, etc.) which are used by processor 12 for generating real time power line thermal ratings.

A weather input module 16 is also coupled to processor 12 to accept and coordinate the receipt of incoming weather data. Weather input module 16 accepts real time weather data from weather data suppliers such as SENES Consultants Limited, Energy & Meteo Systems GmbH, and Pennsylvania State University. The content of the weather data that is received, and the extent of its detail, are discussed below in the exemplary line rating calculations.

Database 14 (system history and operation data) may be included into system 10 in order to provide storage of all input and output data for system calibration as well as for any statistical analysis of output desired by utility personnel.

A system output interface 20 is also illustrated in FIG. 1 and represents any one or more displays or monitors for showing the output line ratings for the power line being monitored. Presumably, system output interface 20 may also allow for a user to input additional data as necessary, scroll through various views of the line rating details and otherwise navigate through the available features and stored data within system 10.

It is understood that system 10 is shown as a single system for exemplary purposes only. It is understood that system 10 may be part of a larger system of geographically remote locations designed to support ratings for multiple power lines throughout a nationwide power grid. Moreover, the subcomponents within a functional arrangement of system 10 designed to provide ratings for a single power line may be located remotely from one another.

Figure 2:
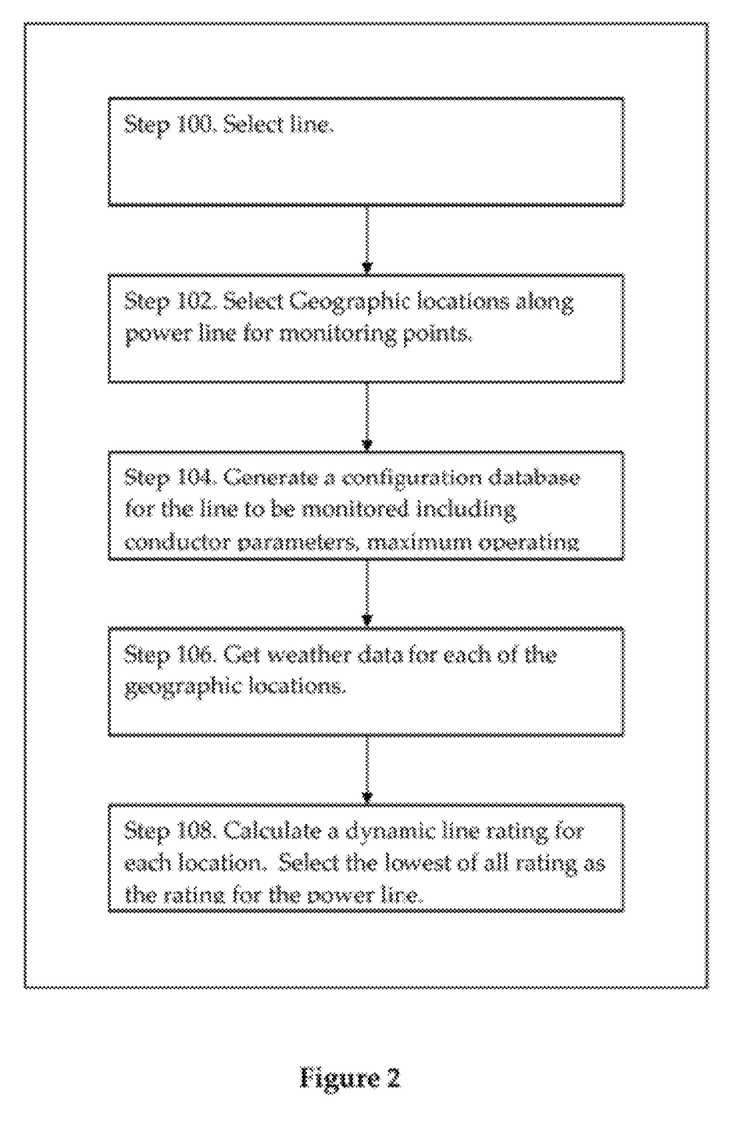
FIG. 2 is a flow chart showing an exemplary set of steps for the operation of the system of FIG. 1.

In one embodiment of the present system, FIG. 2 shows an exemplary flow chart discussing the generation of dynamic power line ratings.

In step 100, one or more power lines are selected for generating power line thermal ratings. For the purposes of illustration, FIG. 2 follows the power line rating for one power line. However, it is understood that the same system 10 may be implemented for managing numerous lines using the same steps.

At step 102, the transmission line is analyzed and optimum geographic locations are identified which will provide a statistically significant sample of weather conditions along the length of the line. For example, along a given power line of 20 miles, 30 or more locations (i.e. by latitude and longitude) may be selected.

The selection of locations may be random or selected based on any number of critical factors such as elevation changes or line direction changes that are representative of weather conditions along the length of the line. Latitudes and Longitudes for these points are identified and supplied to a weather service provider. This location information is recorded in storage module 18.

Next, at step 104, additional information required for calculating line ratings is placed in and/or collected by storage module 18. This information includes, but is not limited to: conductor type(s), number of conductors per bundle, maximum permitted operating temperature, default rating values (to be used in the absence of valid weather service input), conductor parameters, etc.

Figure 3:
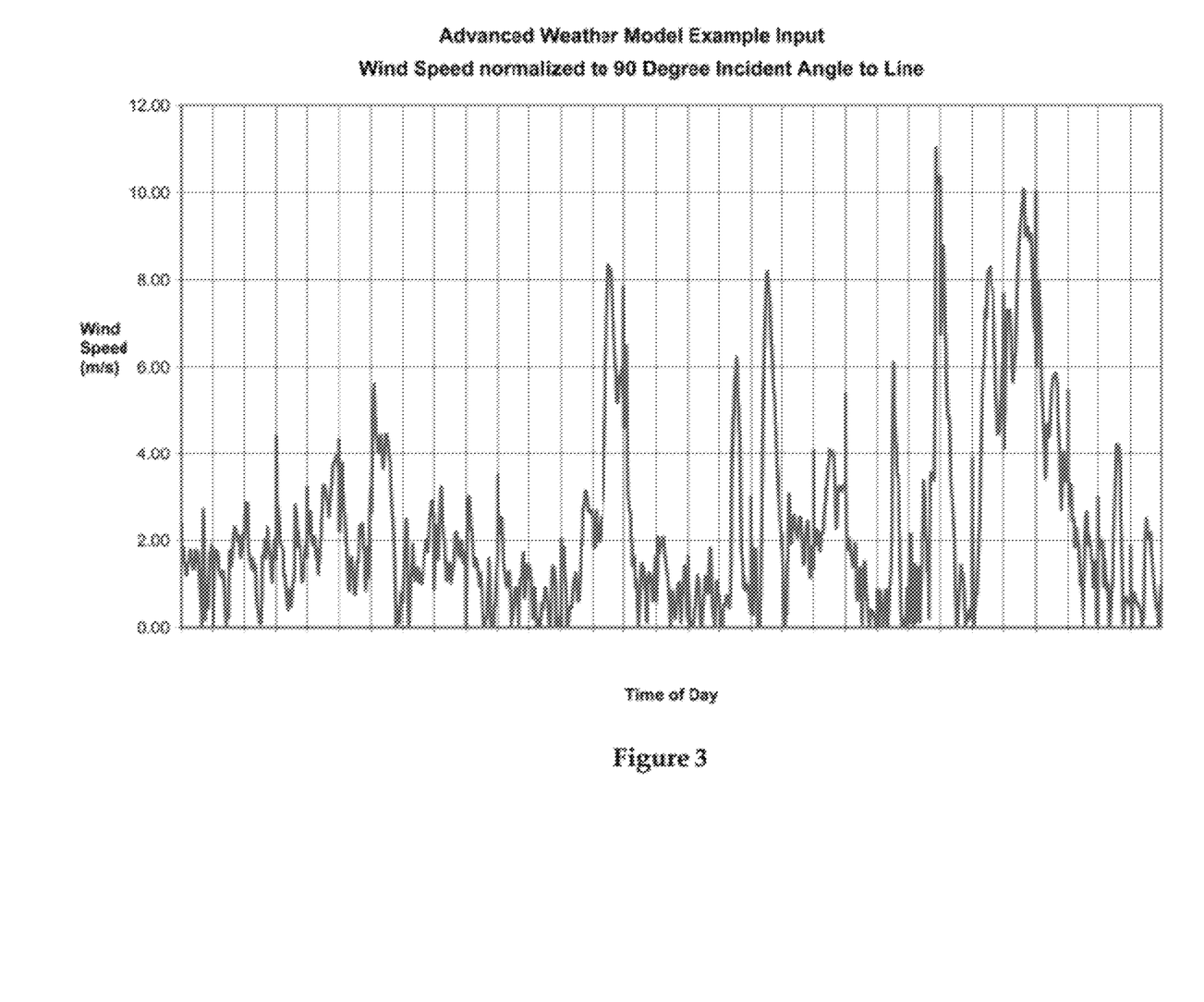
FIG. 3 shows an exemplary plot of advanced weather model input for one transmission line section in accordance with one embodiment.

At step 106, system 10 via weather input module 16 establishes a connection to one or more weather services to obtain real time data about the locations as defined in storage module 18. This data may be used directly by processor 12 for real time calculations of dynamic line ratings. All manipulation of the input data required to make it compatible with the rating algorithm employed is performed by processor 12. For example, it may be necessary to normalize the wind speed and direction provided by the weather service to a comparable wind speed at a 90 degree incident angle to the conductor, see FIG. 3 which shows such normalized wind speed over 1 hr intervals. (Note: if a significant angle exists between one side of the tower and the other, the 90 degree incident angle effective wind speed is calculated for each side individually)

Processor 12 also handles the archiving of all input data as well as output data for future analysis. At a minimum, the data received from the weather data provider should contain wind speed and wind direction, ambient temperature, and solar input for the locations identified. After receiving the weather data as per step 106, processor 12 calculates a dynamic line rating for the power line at step 108 as described in more detail below in the exemplary calculations section.

In one arrangement, the present DLR system 10 may be implemented as a stand alone system for dynamically generating line ratings as outlined above. However, the invention is not limited in this respect. For example, system 10 may also be implemented to work in combination with a tension/sag monitoring system. The combination of a tension/sag monitoring system with the above described weather based system synergistically yields an improved combined dynamic line rating and ground clearance safety that cannot be achieved by either system alone. The synergy results from the weather based system's ability to more accurately identify the dynamic line rating when line amperes are low, and the tension/sag based system's ability to more accurately and safely identify the dynamic line rating when line amperes are high. As noted above, tension/sag based monitoring systems work best at high ampere levels and/or low wind conditions. These are the conditions that produce the highest conductor temperature and the least clearance to ground when a transmission line is called upon to transport the maximum possible power. Therefore, tension/sag based systems deliver the most reliable and safest dynamic line rating when transmission lines are operated at moderate to heavy ampere loads. Conversely, weather only based systems more effectively deliver dynamic line ratings under low ampere and high wind conditions. These are the conditions that produce the lowest conductor temperature and the greatest clearance to ground allowing for better utilization of the power line. While the integrity and safety of the transmission line is not immediately threatened under these conditions, it remains important to have a reliable dynamic line rating. Grid operators need to know the line's capability at both ends of the ampere load spectrum.

When line amperes are low, solely tension/sag based systems default to ambient and solar adjusted ratings predicated on an assumed fixed low wind speed. While these default ratings are operationally safe to use (i.e. line loads are low, therefore there is no danger of the conductor reaching maximum sag), they do not provide an accurate calculation of the true transmission line rating. They may also exhibit a step (as opposed to smooth) change in rating when switching between the default rating method to a tension/sag based rating method. The step change is the result of the default rating being based on a fixed wind speed and the tension/sag based rating reflecting actual wind speed. The step change can have adverse operational impacts for the utility due to the sudden changes.

Figure 4:
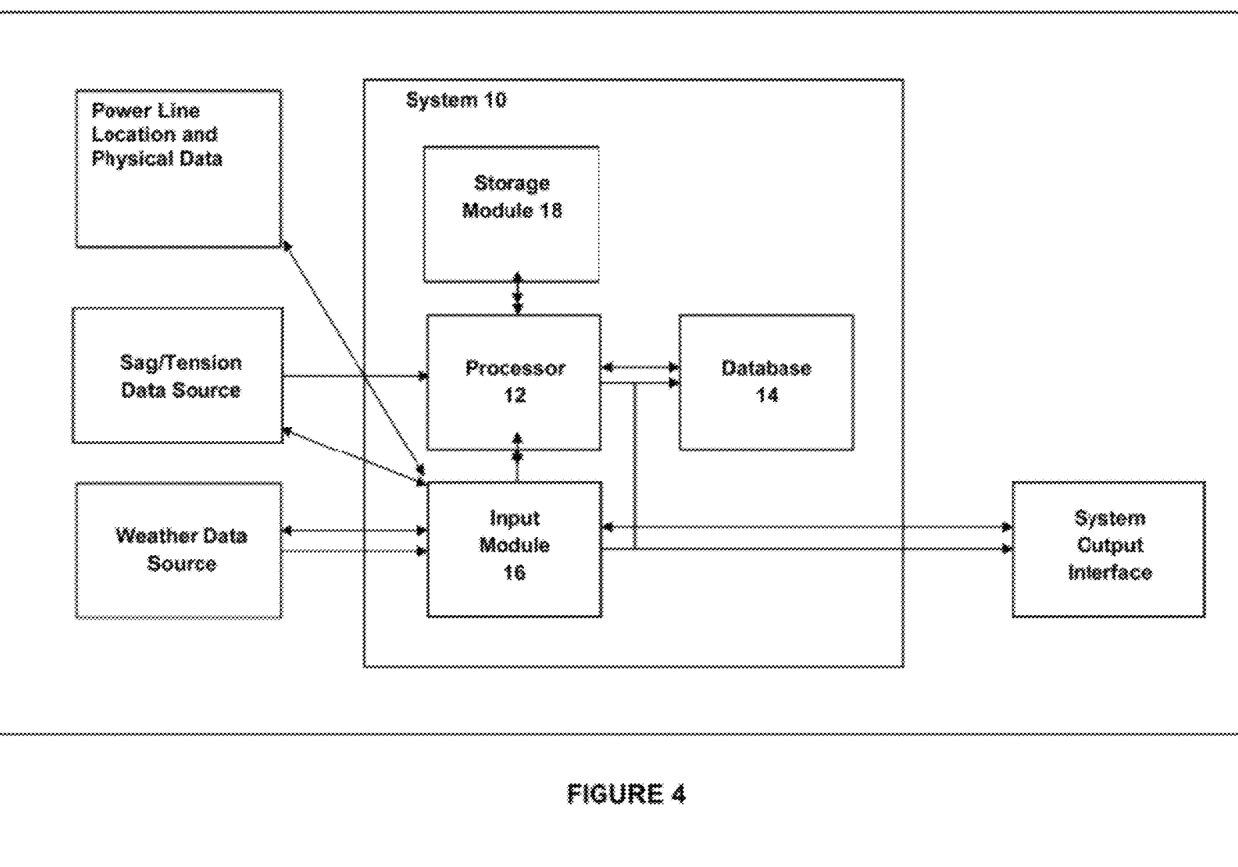
FIG. 4 shows an exemplary dynamic line rating system with combined micro weather & sag/tension data inputs in accordance with one embodiment.

In the present arrangement, combining the claimed weather based dynamic line rating with the tension/sag based dynamic line rating in the present embodiment eliminates the need to use fixed wind speed assumptions under conditions of light line loads or high winds. As such, the best aspects of both rating methods are combined to cover the entire spectrum of possible conditions. An exemplary FIG. 4 shows a dynamic power line rating system, similar to that described above in connection with FIG. 1, with the addition of traditional tension/sag based dynamic line rating data being input to processor 12.

Figure 5:
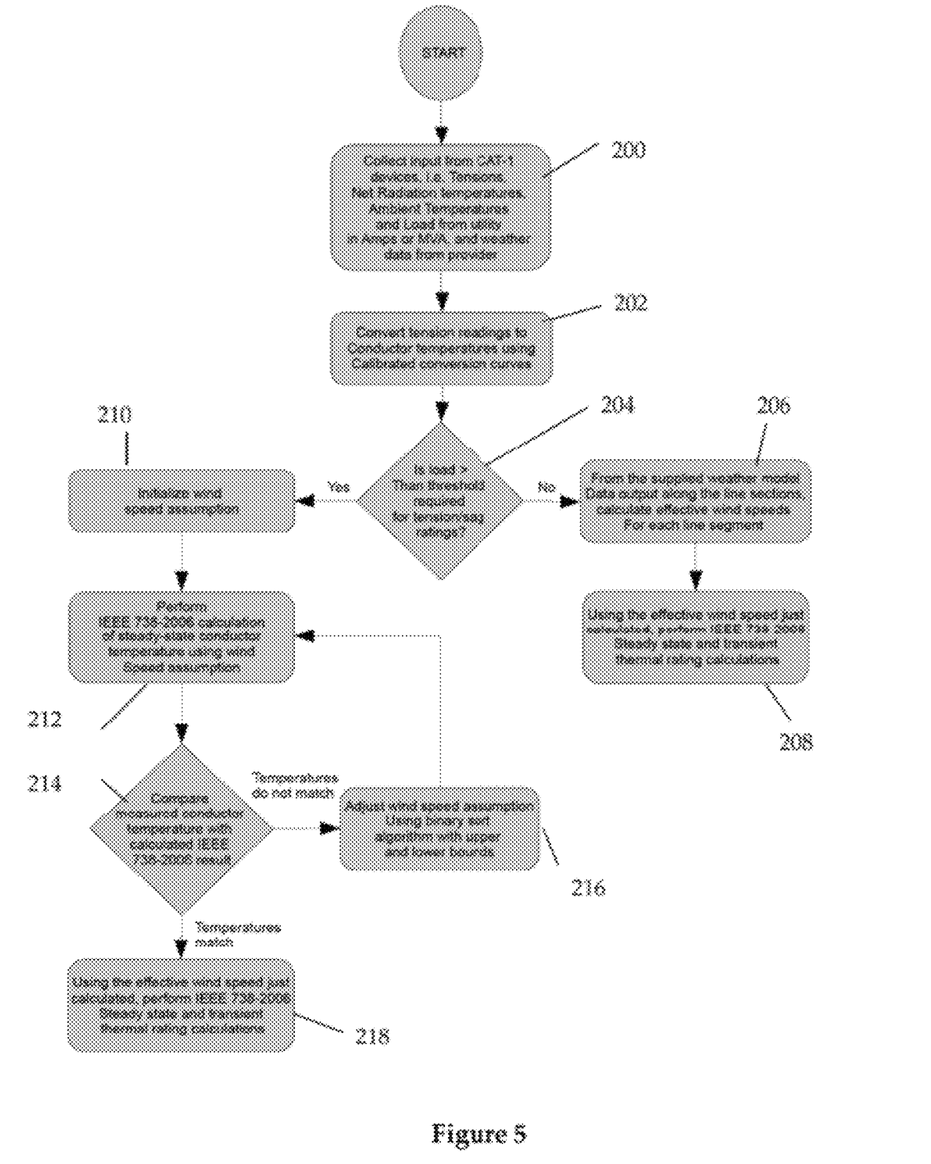
FIG. 5 is a flow chart showing the operation of the dynamic line rating system with combined, micro weather & sag/tension data inputs of FIG. 4, in accordance with one embodiment.

In this arrangement, as shown operationally in flow chart FIG. 5, processor 12 automatically switches between rating methods (dynamic sag to dynamic weather) to provide the best rating output for any given situation. For example, at step 200, for a selected line to be monitored, data is received by system 10 from weather sources, tension sources and line data sources for storage in storage module 12. This data may be integrated with the stored data about the line (e.g. historical line rating data from the same line) taken from storage module 18.

At step 202, sag/tension data is converted to an equivalent temperature data using calibrated conversion curves so that it may be easily compared against the received weather/temperature data. In other words, the measured tension sag data is converted to a conductor temperature using known methods (explained below). This is done because the line rating is in part based on the maximum conductor temperature allowed.

Next at step 204, the present system checks the load (A) that is being applied along the line being monitored. This load data is received from the power line input data being provided to input module 16. As noted above, at lower loads, the preferred method is the use of the above described weather modeling arrangement since tension/sag methodology is inaccurate at lower loads. At higher loads, the tension/sag method is employed. The exact threshold for switching from weather to tension/sag may be provided by the power line manufacturer or set by system 10 or be some combination of the two (eg. start with the manufacturer recommendations and adjust based on historical assessments by system 10 stored in database 14).

Assuming that there is a lower load on the line, below the threshold, at step 206, the supplied weather data is used on a line segment—per-line segment basis and at step 208 a line rating is calculated, for example using IEEE 738-2006 standards using the measured weather and dynamic wind data. As noted above, the overall power line rating will be set to match the segment with the lowest rating.

On the other hand, at step 204, assuming the load (A) is over the predetermined threshold, then the line rating proceeds using the tension/sag based methodology illustrated in steps 210-218. In this case, using the conductor temperature calculated at step 202 (by converting the measured sag to conductor temperature) an assumed wind speed is generated in reverse using a binary sort algorithm to iterate to the final calculation (steps 210-216). An exemplary line rating is shown below, which is related back to these steps for further illustration. Finally, at step 218, once the wind speed is deduced, using IEEE 738-2006 calculation with the maximum conductor temperature known from the manufacturer, a line rating is generated by the present arrangement, that is applicable in the higher load scenarios.

An example of the significant improvements in dynamic line rating that result when tension/sag based methods are synergistically combined with weather based methods as in the present arrangement is presented below with respect to the above steps. This example, utilizes field collected data from a transmission line to demonstrate that the combined methods (of tension sag+dynamic weather) perform seamlessly across the full spectrum of ampere loads, including the elimination of an undesirable step in ratings when the tension/sag based rating method is backed by a static method (e.g. NRT—Net Radiation Method) when shifting between low and moderate ampere loads.

As shown in the following table 1, the following initial parameters are provided to system 1 for an exemplary power line. Thereafter, this initial data is used to show a comparison of three different rating methods (sag/tension, static weather, and dynamic weather) based on these common set of measured input parameters. Such data input relates to step 200 in FIG. 5.

Table 1

Figure 6:
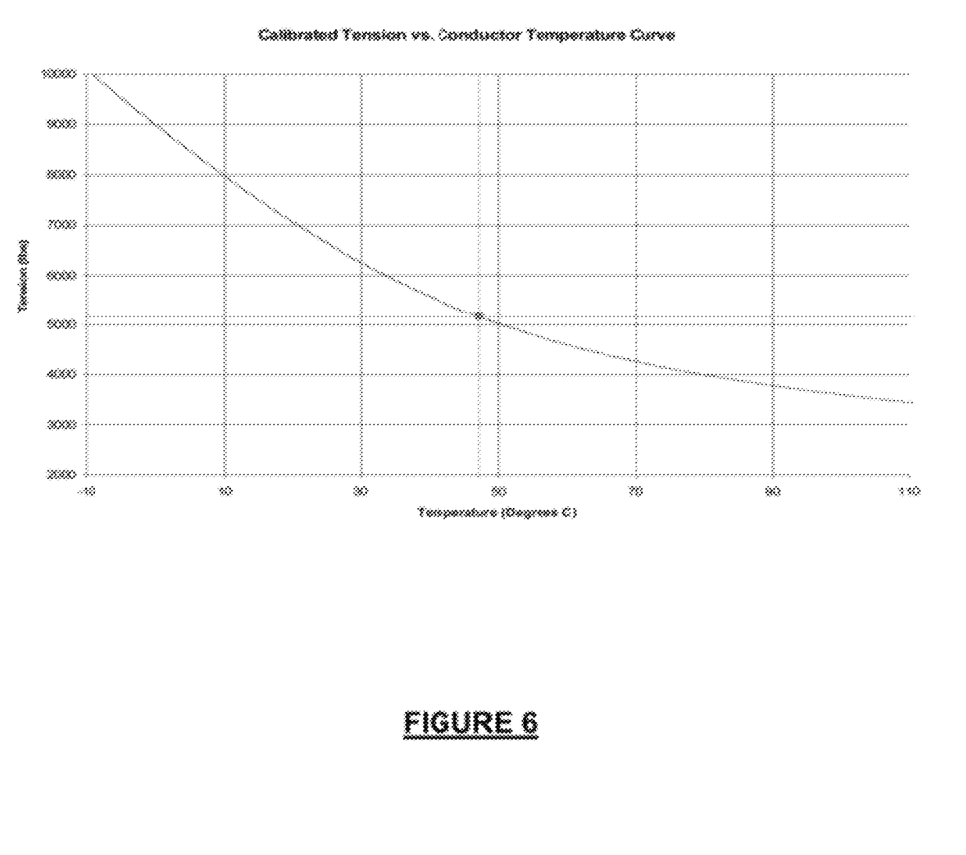
FIG. 6 is a chart showing the calculation of conductor temperature from line tension, in accordance with one embodiment.

Measured Input Parameters:
Tension: 5166 lbs
Ambient: 31.6 C
NRT: 40.3 C
Load: 282 A
Other Parameters (provided by line manufacturer/operator):
Maximum operating temperature: 100 C
Emergency rating time period: 15 minutes
Minimum tension based load threshold: 124 A
Conductor type: DRAKE 795 ACSR
Incident angle: 90 Degrees
Emissivity and absorptivity: 0.4/0.4
Atmosphere: Clear
Elevation: 849 ft Starting from the data of Table 1 a conductor temperature is measured using the tension data according to known methods, such as those disclosed in U.S. Pat. No. 5,517,864 (to Seppa) and as shown in FIG. 6. In this calculation, using the input of a tension of 5166 pounds, in addition to the other measured parameters in Table 1, the tension is converted to a conductor temperature of 47.3° C. This calculation corresponds to step 202 in FIG. 5 above.

It is noted for this conversion calculation, the IEEE solar heating model is disabled (solar time input of 99) and Net Radiation temperature is substituted for ambient temperature, accounting for the solar and ambient temperature heat inputs. Therefore the latitude, date, and conductor orientation relative to North inputs are ignored.

Noting that the current load of 282 A is greater than the tension based load threshold of 124 A (step 204), a tension/sag rating is conducted. In this context starting from the various inputs from Table 1 in conjunction with the converted conductor temperature of 47.3 a calculation is made to determine what the effective wind speed is on the line that would be resulting in the current line temperature. In other words knowing the conductor temperature (based on the tension as explained above) the effective wind speed is determined to be 0.47 ft/s or the wind speed on the line, given all of the input parameters that would be generating the known conductor temperature of 47.3° C. This process is covered by steps 210-216 in FIG. 5 above.

Figure 7:
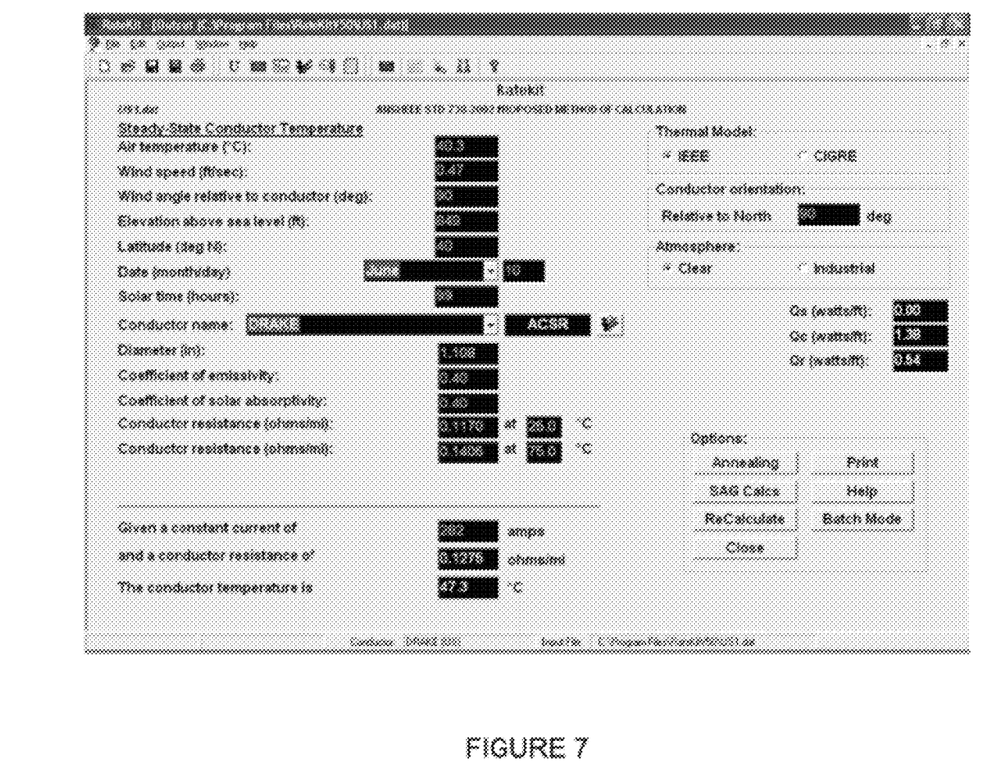
FIG. 7 is a screen shot of a calculation of wind speed using the system as shown in FIG. 4, in accordance with one embodiment.

Thus, in the present arrangement, there is a calculation of what wind speed would result in the measured conductor temperature given the amount of load which is flowing through the line. This is done for example by performing an iterative IEEE 738-2006 steady-state conductor temperature calculation to determine the effective wind speed which would provide the measured conductor temperature under the load and NRT (Net Radiation Temperature) conditions given. In practice, as noted in the loop steps 214-216 this involves setting upper and lower bounds on the possible wind speed and then performing a binary sort algorithm to iterate to the final solution. A screen shot of an exemplary calculation page is shown in FIG. 7.

Figure 8:
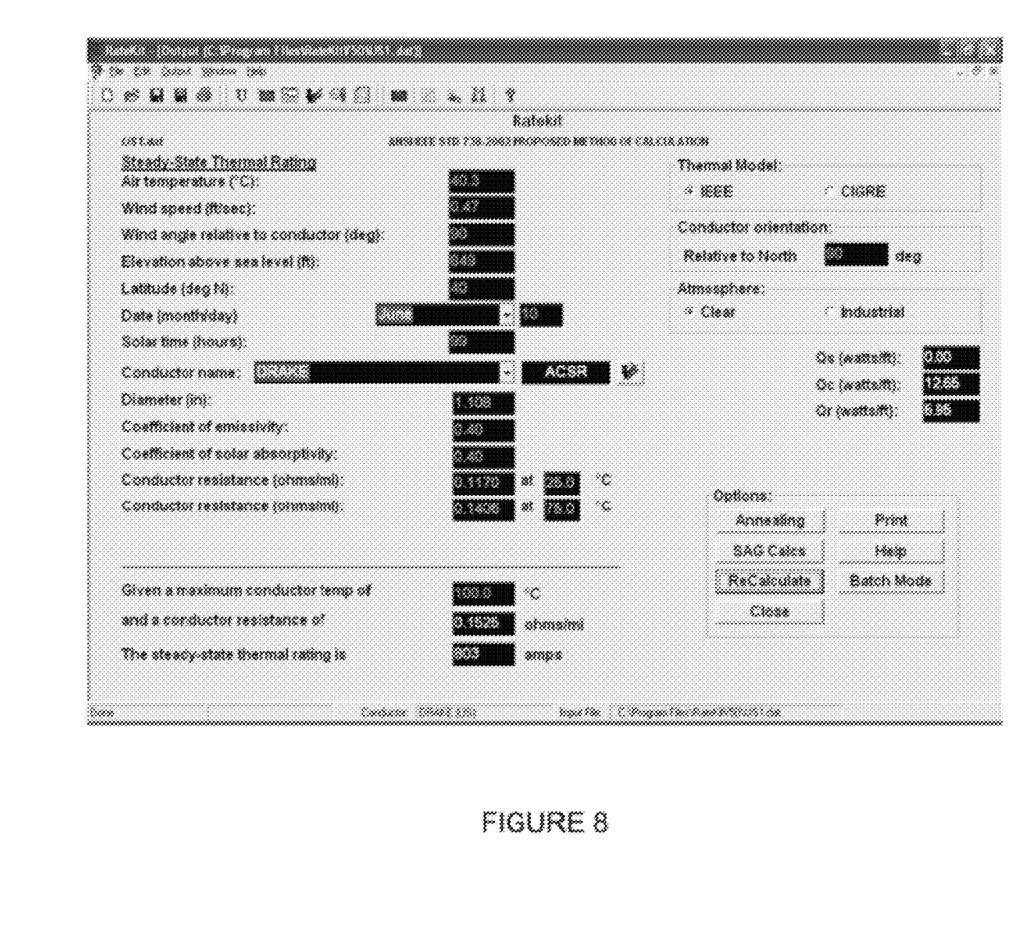
FIG. 8 is a screen shot of a calculation of a line rating using the system as shown in FIG. 4, in accordance with one embodiment.

Now, using the above data, including the reverse calculated wind speed of 0.47 ft/s, an IEEE 738-2006 steady state line rating is calculated (step 218) given the maximum conductor temperature of 100° C., elevation (849 ft). This results in a line rating of 803 A. An exemplary screen shot of this calculation is shown in FIG. 8.

Figure 9:
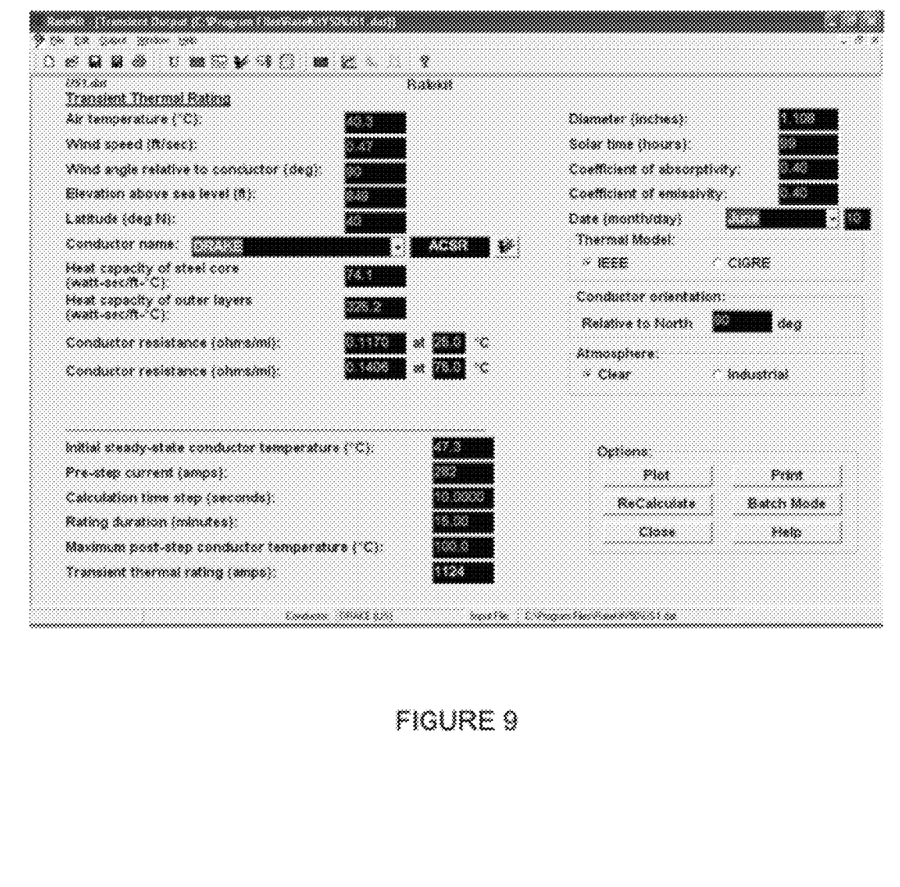
FIG. 9 is a screen shot of a calculation of an emergency line rating using the system as shown in FIG. 4, in accordance with one embodiment.

As a separate exemplary calculation, using the same inputting parameters into an IEEE 738-2006 transient rating calculation for a short-term emergency time period of 15 minutes yields a Short term Emergency Rating for the same line of 1124 A. An exemplary screen shot of this calculation is shown in FIG. 9. This example is not shown in the flow chart on FIG. 5.

Now, taking the example to the prior art, in such systems, when the load falls below the threshold, such as that set in Table 1, tension/sag line rating systems give way to back up static weather model rating systems such as NRT or Net Radiation Temperature methods.

Figure 10:
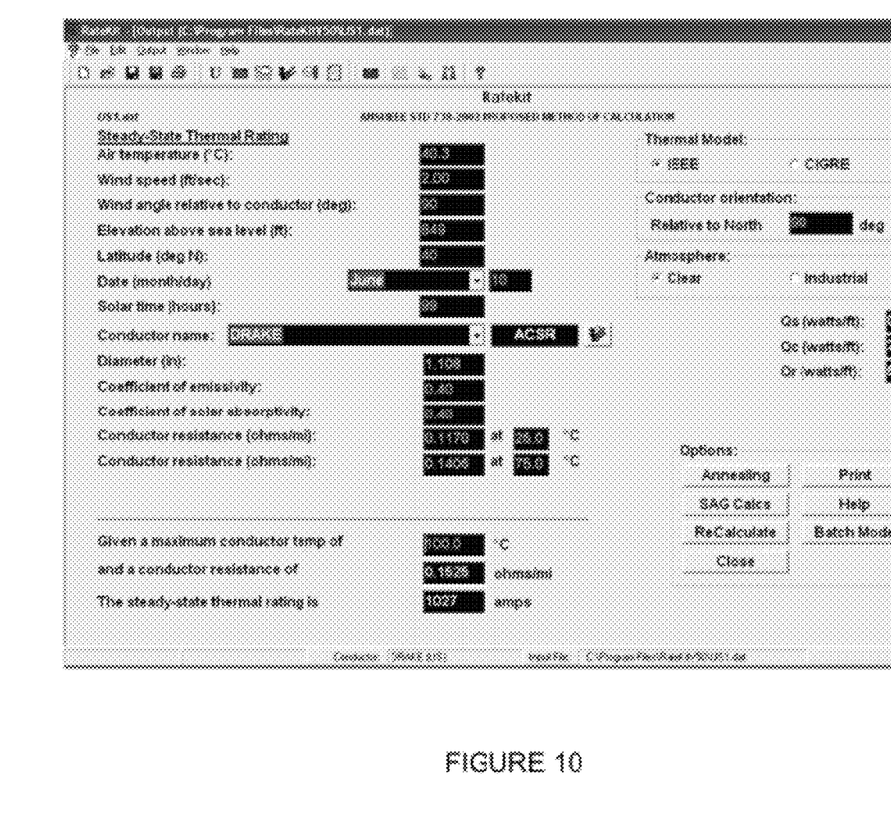
FIG. 10 is a screen shot of a calculation of a line rating using static weather model.

In the present exemplary calculations, it is assumed that instead of having 282 A of current on the line, a value of 100 A is used instead. This falls below the minimum required load for this example as per. Table 1. In such an instance in the prior art, a shift to a static NRT default method would dictate to a substitute a wind speed equivalent to the utilities worst case design assumption. For most utilities in the US, this value is 2 ft/s (but the idea is applicable using other assumptions). Using this default value, along with the measured NRT value of 40.3 C and the maximum operating temperature of 100 C (see Table 1), the IEEE 738-2006 steady-state thermal rating calculation yields 1027 A. An exemplary screen shot of this calculation is shown in FIG. 10.

It is noted that this value is 224 A higher than the 803 A value calculated via the tension/sag based method due to the usage of the (e.g. 2) ft/s wind speed default. Since the default assumed wind value is higher than actual conditions (in the present example), the usage of the NRT fallback method in this case actually yields a misleadingly high rating. This represents a 28% step up. In other words as the load drops on the line and the prior art system switches from the high load tension sag method to the static weather worst case scenario method there is a large jump or step (discontinuity) in the line rating. A case, such as illustrated in this example, could result in the operator having to make additional system configuration changes to bring the load level down to the actual 803 A rating level. This potential discontinuity in ratings between the NRT based static weather method and tension/sag based methods causes concern to some system operators.

Returning to the present system, the use of the dynamic weather model system above in conjunction with the sag/tension model reduces and/or removes this discontinuity.

For example, if the same drop to a 100 A load, and there is a switch to the dynamic weather model (as per step 204), there is no major step difference in line rating. As noted above, the Table 1 data yielded a reverse calculated wind speed of 0.47 ft/s. As explained above, although this is a calculated speed, it is based on actual conditions, as at least initially manifest in the actual tension (5166 lbs) on the line.

Using the present dynamic weather system, using the weather data (eg. from FIG. 3) at specific predetermined points along the corridor (e.g. each tower location along the line) a line rating may be calculated (as per steps 206 and 208). As discussed above, the measurements at each point on the line are associated with the spans to either side of the tower at that point. The wind speed and direction are normalized to a 90 degree incident angle to the conductor resulting in an effective wind speed for those spans (see FIG. 3).

In this situation, the calculated wind speed for all spans in a given line section associated with a tension/sag measurement (typically up to 25 spans out from the measurement site) are then averaged together to generate the average effective wind speed for the section. This yields a wind speed that is substantially equivalent to that which would be calculated by the tension/sag based measurement had it been possible to do so (using the sag tension equipment). In other words, because the load (A) on the line is low, the tension sag equipment does not work effectively and the reverse calculation of the wind speed discussed above, cannot be determined in that manner. However, the calculated wind speed in this manner, could it have been done using that equipment (under higher loads), should be substantially the same as the measured wind speed using the dynamic weather model system described above, as the reverse calculated wind speed in using the sag/tension equipment inherently (via the line tension and other input parameters of Table 1) incorporates the actual wind blowing over the line.

Figure 11:
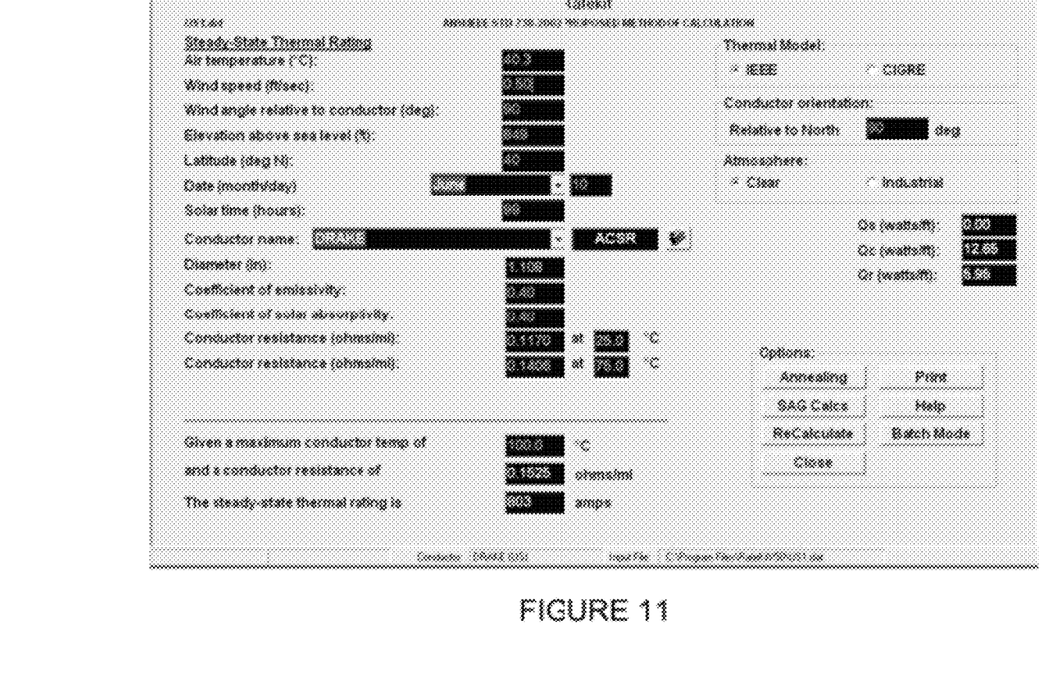
FIG. 11, is a screen shot of a calculation of a line rating using a dynamic micro weather model as shown in FIG. 4, in accordance with one embodiment.

For the purpose of this example, the processing of weather model data (e.g. extrapolated from data similar to that shown in FIG. 3) yields an effective wind of 0.50 ft/s (which is close to the reverse calculated 0.47 ft/s). An IEEE 738-2006 steady state thermal rating calculation is performed, as done previously with the sag/tension equipment, which yields a steady-state thermal rating: 803 A. An exemplary screen shot of this calculation is shown in FIG. 11.

As a result of using the present arrangement, where a dynamic wind rating model is used as a backup for the tension/sag model there is a relatively seamless jump in line ratings when the load is lowered below the load threshold between the two models. By using the true and accurate wind speed data for the dynamic weather model back up arrangement, there is a correlation with the wind speed (as determined using the tension/sag equipment) thus producing a better transition when the load on the line is raised or lowered above and below the threshold. This carries over for actual line cooling wind speeds both above and below the default wind speeds used in static NRT type weather models. For example in better wind conditions, and at lower line loads with the weather model in effect for line ratings, the line ratings will not use estimates, but rather frequently updated real time weather data to allow for better utilization of the line.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A system for generating dynamic line ratings comprising:
    a module for receiving physical data concerning a power line, said data having:
        location data including geographic locations of the path of said power line;
        at least one physical measurement concerning a physical condition of said power line; and
        at least one physical fact concerning said power line;
    a module for storing said data concerning said power line;
    a module for receiving periodically updated weather prediction information associated with a select set of said geographic locations of the path of said power line; and
    a processor, said processor configured to receive input on a load passing through said power line and to determine if said load is above or below a predetermined load threshold,
    wherein if said power line has a load exceeding said threshold, said processor calculates a line rating based on said at least one physical measurements data concerning said power line, and
    wherein if said power line has a load below said threshold, said processor calculates a line rating based on said weather prediction information associated with each of said geographic locations of the path of said power line,
    wherein said processor periodically receives updated input on said load passing through said power line and, if said load has changed from its previously detected level to a new level that switches from one side of said threshold to another side of said threshold, said processor dynamically switches said line rating to a rating based on said physical measurements data if previously based on said weather prediction information or switches said line rating to a rating based on said weather prediction information if previously based on said physical measurements data.

2. The system as claimed in claim 1, wherein said location data including geographic locations of the path of said power line is latitude and longitude data.

3. The system as claimed in claim 2, wherein said select set of geographic locations of the path of said power line is selected by examining critical physical parameters of said line including features selected from the group consisting of elevation, direction/angle changes, surrounding vegetation, structures, and surrounding terrain.

4. The system as claimed in claim 2, wherein said select set of geographic locations of the path of said power line is selected at a density appropriate to cover the expected variability in wind speeds along a transmission corridor of said power line.

5. The system as claimed in claim 1, wherein said physical measurement concerning a physical condition of said power line is at least one tension/sag measurement.

6. The system as claimed in claim 1, wherein said at least one physical fact concerning said power line is selected from the group consisting of, Maximum operating temperature, Emergency rating time period, minimum tension based load threshold, conductor type, incident angle, emissivity and absorptivity, and elevation.

7. The system as claimed in claim 1, wherein said module for receiving said periodically updated weather prediction information associated with said select set of geographic locations receives high resolution weather modeling and prediction data on scale of 1 km×1 km or less.

8. The system as claimed in claim 1, wherein said module for receiving said periodically updated weather prediction information associated with said select set of geographic locations receives high resolution weather modeling and prediction data at intervals of 10 minutes or less.

9. The system as claimed in claim 1, wherein said predetermined threshold is included with said physical facts concerning said power line.

10. The system as claimed in claim 1, wherein said processor dynamically changes from initiating a line rating based on said at least one physical measurement to initiating a line rating based on said periodically updated weather prediction data associated with said select set of geographic locations of the path of said power line when the power line shifts from a load above said threshold to a load below said threshold.

11. The system as claimed in claim 10, wherein said line rating and load are measured in amperes.

12. The system as claimed in claim 1, wherein said periodically updated weather prediction information is normalized to create a 90 degree incident angle effective wind speed based on said path of said power line.

13. A system for generating dynamic line ratings comprising:
   a module for receiving data concerning a power line, said data having:
      location data including geographic locations of the path of along the length of said power line; and
      at least one physical fact concerning said power line;
   a module for storing said data concerning said power line;
   a module for receiving periodically updated weather prediction information associated with a select set of said geographic locations of the path of said power line; and
   a processor configured to receive input on a load passing through said power line and to determine if said load is above or below a predetermined load threshold wherein if said power line has a load below said threshold, said processor initiates a line rating based on said weather prediction information associated with select set of said geographic locations of the path along the length of said power line,
   wherein said processor periodically receives updated input on said load passing through said power line and, if said load has changed from its previously detected level to a new level that switches from one side of said threshold to another side of said threshold, said processor dynamically switches said line rating to a rating based on a second manner for calculating line ratings if previously based on said weather prediction information or switches said line rating to a rating based on said weather prediction information if previously based on said second manner for calculating line ratings.

14. The system as claimed in claim 13, wherein said module for receiving data concerning a power line is configured to receive at least one physical measurement concerning a physical condition of said power line.

15. The system as claimed in claim 14, wherein if said power line has a load exceeding a predetermined threshold, then said processor initiates a line rating based on said at least one physical measurement data concerning said power line, and wherein if said power line has a load below said predetermined threshold, then said processor initiates a line rating based on said real time weather modeling or prediction information associated with said select set of geographic locations along the length of the path of said power line.

16. The system as claimed in claim 13, wherein said weather prediction information is normalized to create a 90 degree incident angle effective wind speed based on said path of said power line.

* * * * *